Sept. 2, 1930.  C. E. HEMMINGER  1,774,972
GAS TURBINE
Filed Aug. 13, 1924   3 Sheets-Sheet 3
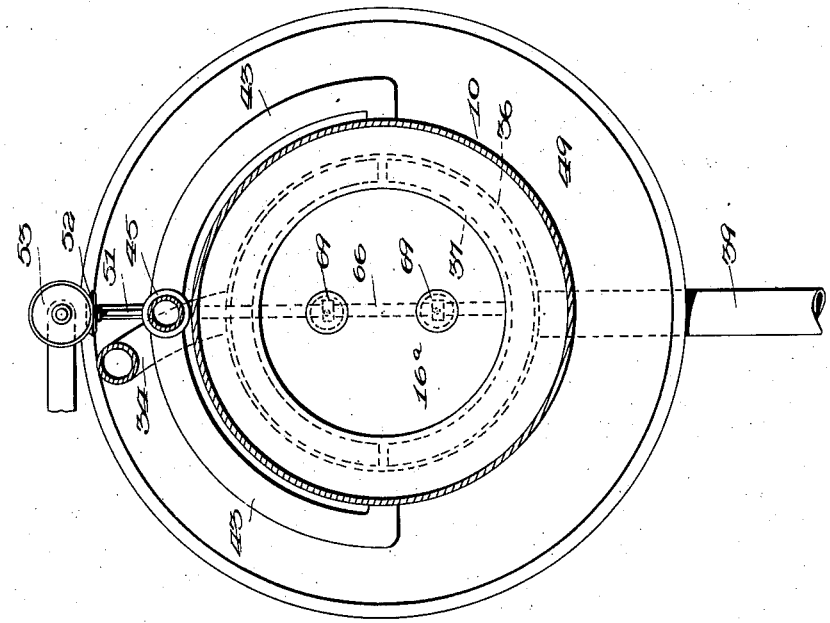
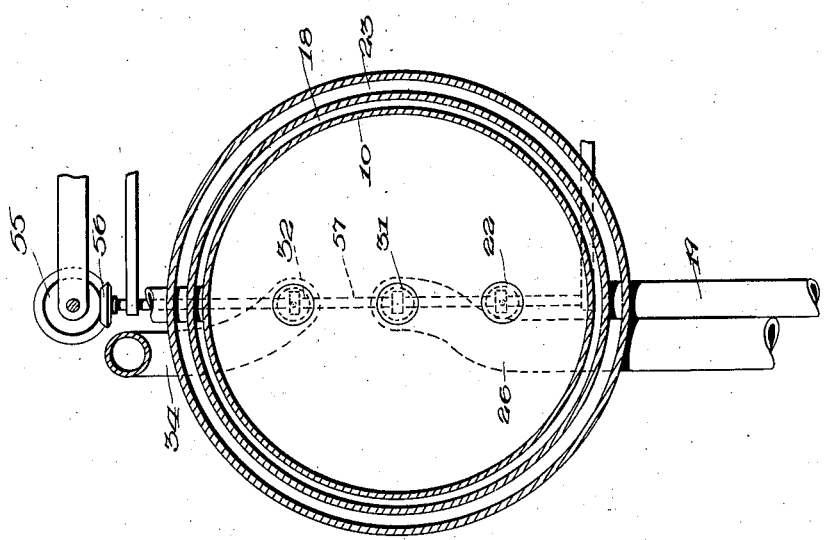
WITNESS
INVENTOR
C. E. Hemminger,
BY
ATTORNEYS Patented Sept. 2, 1930

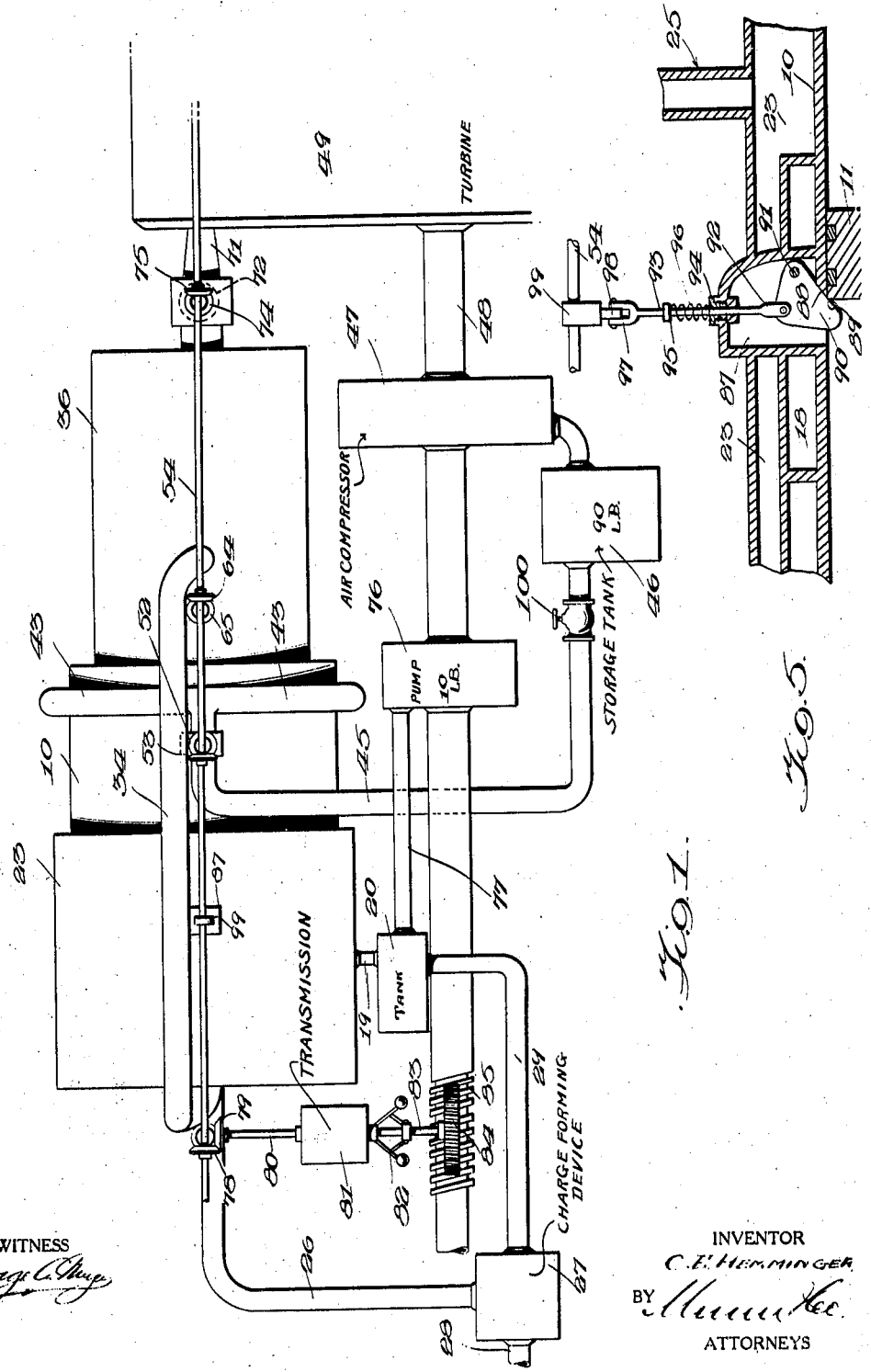

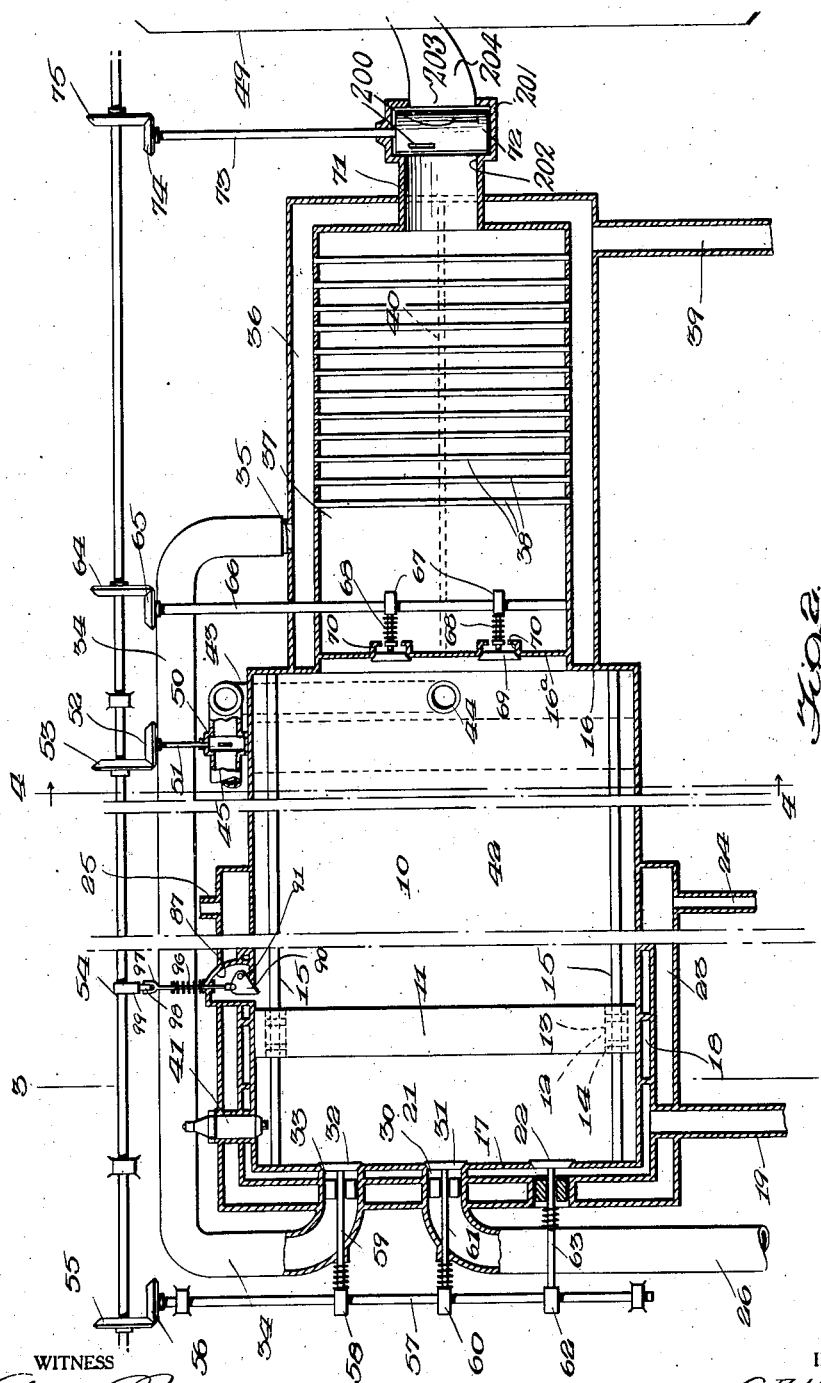

1,774,972

UNITED STATES PATENT OFFICE

CHARLES EDWARD HEMMINGER, OF ROCKWOOD, PENNSYLVANIA

GAS TURBINE

Application filed August 13, 1924. Serial No. 731,804.

This invention relates to power plants and is more particularly directed to the combination of an internal combustion engine and a turbine.

An object of the invention is the provision of a power plant in which a fluid is compressed adiabatically by a floating piston of an internal combustion engine and then expanded through the heat energy of the exhaust and cooling gases of the internal combustion engine whence the energy of the expanded gases is intended to do mechanical work in a turbine.

A further object of the invention is the provision of a power plant for converting the heat units of the exhaust gases of an internal combustion engine into useful work for causing an expansion of compressed air in operating a turbine and in which compressed air form a substitute for the mechanical connection between the piston and drive shaft of the engine thereby eliminating the losses due to the inertia of the fly wheel and the heavy moving parts of the mechanically connected engine and also decreasing the losses of kinetic energy due to stopping of the large, fast moving masses.

The losses of the present day engine, due to a distortion of the indicator card curves of the pressures in the combustion chambers are caused by the fly wheel and the crank shaft and therefore by the dispensing of such elements the initial and operating costs will be less not only because of the absence of the fly wheel but because of the lack of necessity for requiring heavy bearings in foundation to support the same and to care for the impulsive forces so that the friction in the engine will be less due to the lack of bearings, massive parts and the lack of impulsive forces on the bearings causing the side strains.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a plan view of the power plant constructed according to the principles of my invention.

Figure 2 is a vertical longitudinal section of a portion of the power plant which includes the internal combustion engine and the iso-thermo expansion chamber.

Figure 3 is a transverse vertical section taken along the line 3—3 of Figure 2.

Figure 4 is a transverse vertical section taken along the line 4—4 of Figure 2.

Figure 5 is a fragmentary vertical section showing an enlarged detail of the mechanism for temporarily locking the piston against movement.

Referring more particularly to the drawings, 10 designates an internal combustion engine cylinder in which is mounted for movement a floating piston 11. This piston is provided with passages 12 in which sleeves 13 are placed carrying packing rings 14. Guide rods 15 which are connected with the bottom 16 and the cylinder head 17 of the cylinder are received by the sleeves 13 and the packing rings engaging said guide rods are adapted to prevent loss of fluid past the piston 11.

Around the upper end of the cylinder 10 is formed a jacket 18 which through a pipe 19 is connected with a compressed air storage tank 20 for supplying air under pressure of approximately 10 pounds to the jacket 18 which is at proper times admitted to the combustion chamber 21 of the cylinder 10 through a port controlled by a poppet valve 22. When valve 22 is opened, chamber 21 is opened to jacket 18 which in turn is directly connected to pipe 19 through which compressed air is conducted from tank 20.

It will be noted therefore that cylinder 10 is not directly open to the atmosphere. A water jacket 23 surrounds not only the air jacket 18 but also a portion of the outer wall of the cylinder 10 and has an inlet pipe 24 connected with a source of supply while a discharge pipe 25 is connected to the water jacket at a level which will cause a proper circulation of the water in the jacket for cooling the engine.

A conduit 26 connected between a port in the cylinder head 17 and a charge forming device 27 is adapted to supply the combustion chamber 21 with the proper charge of fuel for operating the piston 11. The fuel pipe 28 connected with the charge forming device 27 is adapted to supply fuel to the same while a conduit 29 connected with the storage tank 20 is adapted to supply sufficient pressure to force the fuel into the combustion chamber 21. A port 30 in the cylinder head 17 forming an entrance for the fuel to the combustion chamber is controlled by a valve 31.

A valve 32 controls an exhaust port 33 which is connected with an exhaust conduit 34. This exhaust conduit opens as shown at 35 into a heating chamber 36. This chamber is provided with a casing 37 having a plurality of pipes 38 extending transversely of the casing 37 so that the exhaust from the conduit 34 is passed from one side of the chamber 36 through the said pipes and escapes through the discharge conduit 39. A baffle 40 located at diametrically opposite points between the walls of the casing 37 and the chamber 36 forces the exhaust gas entering chamber 36 from conduit 34 to pass through the tubes 38 to one side of the baffle and enter the opposite side of the casing from said tubes while permitting the exhaust gases to circulate around the outer wall of the casing 37.

A spark plug 41 passing through the cylinder wall, the walls of the air chamber 18 and the cooling jacket 23 is adapted to be controlled by the usual ignition device for igniting the charge of fuel in a combustion chamber 21 periodically during the operation of the engine. A portion 42 of the cylinder 10 upon the opposite side of the piston 11 from the combustion chamber 21 is adapted to be supplied with compressed air through branch pipes 43 opening into the chamber 42 at diametrically opposite points as shown at 44. These branch pipes are connected with a main pipe 45 and a storage tank 46. The tank 46 is supplied by compressed air at approximately 90 pounds pressure through a pump 47 directly driven by a horizontal shaft 48. This shaft is driven by a turbine 49 directly connected with the shaft and the turbine may be of any approved construction.

The admission of compressed air through tank 46 to branch pipes 43 to the chamber 42 of the engine cylinder is controlled by a rotary valve mounted in the valve casing 50 and operated by a shaft 51 connected with a gear 52 which meshes with a gear 53 carried by a timing shaft 54.

The timing shaft has a gear 55 meshing with a gear 56 rigid with a shaft 57. This shaft is provided with a cam 58 which is adapted to operate a stem 59 in timed relation for periodically opening the exhaust valve 32. A cam 60 on shaft 57 operates the valve stem 61 for periodically operating the fuel valve 31. A third cam 62 on shaft 57 operates the stem 63 and likewise the air admission valve 22.

A gear 64 on shaft 54 meshes with a gear 65 which is rigid with a shaft 66. This shaft passes through stuffing boxes in the walls of the chamber 36 and the casing 37 and is provided with cams 67 for operating stems 68 and likewise valves 69. These valves control ports 70 for admitting the compressed air in chamber 42 to the casing 37 where it is heated by the exhaust gases and passing through a conduit 71 to the housing of the turbine 49. A rotary valve is mounted in a casing 72 and operated by a shaft 73 through a gear 74 and a gear 75, the gear 75 being rigid with shaft 54.

A pump 76 directly connected with the turbine shaft 28 is adapted to supply compressed air at approximately 10 pounds through conduit 77 to the storage chamber 20. The shaft 54 is operated through a gear 78 on the shaft 54 meshing with a gear 79 rigid with a shaft 80. This shaft is received within a transmission casing 81 which carries the transmission of any standard make and which is controlled through a governor 82 for shifting the gears and maintaining the speed of the shaft 54 at a predetermined rate. The governor shaft 83 carries a worm gear 84 meshing with the worm 85 on the turbine shaft 48.

Since the piston is not controlled by a fly wheel, a crank shaft, and the usual connecting rod, it is necessary to provide means for maintaining the piston upon its inward stroke and in a predetermined spaced relation with the cylinder head 17 in order to supply the proper amount of fuel to the combustion chamber 21. I therefore provide an enclosed pocket 87 which opens through the cylinder at one side and through the air jacket 18 and water jacket 23. The cylinder wall, as shown at 88 is cut off at an angle upon which is adapted to be seated one side 89 of a triangular shaped oscillating member 90. This member is pivoted at 91 in the pocket 87. The upper outer end of the oscillating member 90 is connected by means of a fork 92 which is integral with a reciprocating rod 93. This rod passes through a stuffing box 94 formed in a passage in the outer wall of the pocket 87. A collar 95 on the rod 93 engages one end of a coil spring 96, the other end of the coil spring being in engagement with the stuffing box 94. This spring tends to maintain the rod 93 projected outwardly from the pocket 87 and for maintaining the member 90 within the pocket 87. A fork 97 on the outer end of the rod 93 carries a roller 98 which is maintained in engagement with a cam 99 on shaft 54. The cam 99 is adapted to move the member 90 inwardly to engage piston 11 against the tension of the spring 96. A valve 100 is manually operated for cutting off the compressed air from the storage chamber 46 to the chamber 42 in the cylinder 10.

In the operation of my device the piston 11 is moved towards the cylinder head by the compressed air admitted through pipe 45 and branch pipe 43. When the explosion occurs in the combustion chamber 21 the piston 11 is driven in the opposite direction and at this time the shaft 66 causes the cam 67 to open the valve 69 whence the compressed air or any other gas suitable for the purpose which has been compressed adiabatically in chamber 42 escapes into casing 37 where it is expanded due to the heat of the exhaust gases circulating through the chamber 36 and the conduits 38 with the gas or air from chamber 42 circulating around pipes 38 and being discharged from the conduits 71 with the discharge being controlled by the valve 72. Due to the heat which is utilized from the exhaust gases in the chamber 36 the pressure of the air or gases from chamber 42 are greatly increased and are admitted to the turbine 49 for driving the same.

The operation of the turbine as has been explained operates pumps 47 and 76 and shafts 80 and 54.

Since the internal combustion engine is of the two cycle type the exhaust gases are discharged through pipe 34 when the piston is moved towards the cylinder head, and the compressed gases are admitted through pipes 43 by the periodic movement of the valve in the casing 50. When the piston 11 reaches a predetermined point and which is adjacent the pocket 87 the cam 99 is operated for moving the member 90 through the opening where the pocket 87 is in communication with the combustion chamber 21 in time to engage the piston 11 and maintain it against furthur movement towards the cylinder head 17. Just before the piston 11 reaches this point the valve 22 is opened by the cam 62 and compressed air at approximately 10 pounds pressure is admitted to the combustion chamber 21 and causes scavenging of the combustion chamber so that the combustion chamber is completely cleaned of exhaust gases. At about the time that the piston 11 is maintained by the keeper 90 the exhaust valve 32 is closed and a charge of fuel is admitted through valve 31. The cam 99 has been revolved sufficiently to permit the spring 96 to return the keeper 90 within the pocket 87 and permit the compressed gases in chamber 42 to complete the inward stroke of the piston 11 whence the spark plug 41 will ignite the combustible mixture in chamber 21 and again cause the piston 11 to move towards the opposite end 16 of the cylinder and the valves 69 are opened substantially at the time when the piston 11 tends to move towards said valves so that the compressed gases in the chamber 42 are discharged at this time into the casing 37.

The charge forming device shown diagrammatically in Figure 1 and designated by the numeral 27 may be of any approved type such that a combustible mixture rich in fuel is forced through the conduit 26 or the compressed air in the container 20 may force a charge of heavy fuel into the combustion chamber 21. The transmission, indicated by the numeral 81 in Fig. 1 is of the change speed type which is well known in the art and which has shiftable gears (not shown) controlled my the governor 82. In other words, when the governor 82 speeds up the usual gears in the transmission 81 are moved in order to cut down the speed of rotation of the shaft 80.

The valve 72 is revolved at constant speed and is adapted to place the chamber 37 in communication with the pipe 204 and likewise the turbine 49 while permitting the gases which are heated in the chamber 37 to build up sufficient pressure so that when the gases are discharged into the turbine 49 they will have sufficient energy to operate such turbine. The valve 72 is revolved with such speed and the ports 200 are sufficient in number to provide for a substantial flow of expanding gases from the chamber 37.

What I claim is:

1. A power plant comprising in combination, an internal combustion engine having a cylinder and a piston freely movable in said cylinder, a combustion chamber, means for supplying an explosive charge to the combustion chamber for moving the piston in one direction, means for supplying the cylinder with a compressed fluid for returning the piston and compressing the explosive charge, said fluid after expending its energy in returning the piston being adapted to be compressed by the piston when operated by the explosive charge, a heating chamber adapted to receive the exhaust from the combustion chamber, a pipe connecting the heating chamber with the combustion chamber, an air chamber surrounded by the heating chamber and having a valve controlled communication with the cylinder whereby the compressed fluid is admitted to the air chamber and expanded, a turbine connected with the air chamber, and means for maintaining the piston against movement during certain portions of the cycle of operation of the engine for predetermining the capacity of the combustion chamber.

2. A power plant comprising in combination, an internal combustion engine having a cylinder and a piston freely movable in said cylinder, a combustion chamber, means for supplying an explosive charge to the combustion chamber for moving the piston in one direction, means for supplying the cylinder with a compressed fluid for returning the piston and compressing the explosive charge, said fluid after expending its energy in returning the piston being adapted to be compressed by the piston when operated by the explosive charge, a heating chamber adapted to receive the exhaust from the combustion chamber, a pipe connecting the heating chamber with the combustion chamber, an air chamber surrounded by the heating chamber and having a valve controlled communication with the cylinder whereby the compressed fluid is admitted to the air chamber and expanded, a turbine connected with the air chamber and operated by the fluid under pressure from the air chamber, a shaft driven by the turbine, an air pump driven by said shaft for forcing the explosive charge into the combustion chamber, and means for retaining the piston against movement during the admission of the explosive charge.

3. A power plant comprising in combination, an internal combustion engine having a cylinder and a piston freely movable in said cylinder, a combustion chamber, means for supplying an explosive charge to the combustion chamber for moving the piston in one direction, means for supplying the cylinder with a compressed fluid for returning the piston and compressing the explosive charge, said fluid after expending its energy in returning the piston being adapted to be compressed by the piston when operated by the explosive charge, a heating chamber adapted to receive the exhaust from the combustion chamber, a pipe connecting the heating chamber with the combustion chamber, an air chamber surrounded by the heating chamber and having a valve controlled communication with the cylinder whereby the compressed fluid is admitted to the air chamber and expanded, a turbine connected with the air chamber and operated by the fluid under pressure from the air chamber, a shaft driven by the turbine, an air pump driven by said shaft for forcing the explosive charge into the combustion chamber, means for retaining the piston against movement during the admission of the explosive charge, a timing shaft operatively connected with the turbine shaft, and means connected with the retaining means for the piston and operated by the timing shaft for actuating said retaining means.

4. A power plant comprising in combination, an internal combustion engine having a cylinder and a piston freely movable in said cylinder, a combustion chamber, means for supplying an explosive charge to the combustion chamber for moving the piston in one direction, means for supplying the cylinder with a compressed fluid for returning the piston and compressing the explosive charge, said fluid after expending its energy in returning the piston being adapted to be compressed by the piston when operated by the explosive charge, a heating chamber adapted to receive the exhaust from the combustion chamber, a pipe connecting the heating chamber with the combustion chamber, an air chamber surrounded by the heating chamber and having a valve controlled communication with the cylinder whereby the compressed fluid is admitted to the air chamber and expanded, a turbine connected with the air chamber and operated by the fluid under pressure from the air chamber, means for periodically retaining the piston against movement, and means for guiding the piston in the cylinder.

5. A power plant comprising in combination, an internal combustion engine having a cylinder and a piston freely movable in said cylinder, a combustion chamber, means for supplying an explosive charge to the combustion chamber for moving the piston in one direction, means for supplying the cylinder with a compressed fluid for returning the piston and compressing the explosive charge, said fluid after expending its energy in returning the piston being adapted to be compressed by the piston when operated by the explosive charge, a heating chamber adapted to receive the exhaust from the combustion chamber, a pipe connecting the heating chamber with the combustion chamber, an air chamber surrounded by the heating chamber and having a valve controlled communication with the cylinder whereby the compressed fluid is admitted to the air chamber and expanded, a turbine connected with the air chamber and operated by the fluid under pressure from the air chamber, a shaft driven by the turbine, said means for supplying a compressed fluid to the cylinder comprising a pump operated by the turbine shaft, a timing shaft driven by the turbine shaft, a valve for controlling the admission of the compressed fluid to the cylinder and operated by the timing shaft, and means operated by the timing shaft for retaining the piston periodically against movement.

6. A power plant comprising in combination, an internal combustion engine having a cylinder, a piston freely movable in said cylinder, a combustion chamber, means for supplying an explosive charge to the combustion chamber for moving the piston in one direction, means for supplying the cylinder with a compressed fluid on the other side of the piston for returning the piston and compressing the explosive charge, said fluid after expending its energy in returning the piston being adapted to be compressed by the piston when operated by the explosive charge, an air chamber connected to the cylinder to receive the compressed fluid, a casing embracing said air chamber and connected with the combustion chamber of the engine for receiving exhaust gases to heat the air chamber which receives the compressed fluid whereby the fluid is expanded, a turbine connected with the air chamber and operated by the fluid under pressure from the air chamber, a jacket embracing the engine cylinder, a shaft driven by the turbine, a pump connected with the turbine shaft and adapted to supply the jacket embracing the engine cylinder with compressed air, and means connecting the jacket with the combustion chamber of the engine.

7. A power plant comprising in combination, an internal combustion engine having a cylinder, a piston freely movable in said cylinder, a combustion chamber, means for supplying an explosive charge to the combustion chamber for moving the piston in one direction, means for supplying the cylinder with a compressed fluid on the other side of the piston for returning the piston and compressing the explosive charge, said fluid after expending its energy in returning the piston being adapted to be compressed by the piston when operated by the explosive charge, an air chamber connected to the cylinder to receive the compressed fluid, a casing embracing said air chamber and connected with the combustion chamber of the engine for receiving exhaust gases to heat the air chamber which receives the compressed fluid whereby the fluid is expanded, a turbine connected with the air chamber and operated by the fluid under pressure from the air chamber, a jacket embracing the engine cylinder, a shaft driven by the turbine, a pump connected with the turbine shaft and adapted to supply the jacket embracing the engine cylinder with compressed air, means connecting the jacket with the combustion chamber of the engine, a timing shaft operatively connected with the turbine shaft, and valves actuated by the timing shaft for controlling the admission of the compressed air and the explosive charge.

CHARLES EDWARD HEMMINGER.